(12) United States Patent
Osnato et al.

(10) Patent No.: US 8,574,050 B2
(45) Date of Patent: Nov. 5, 2013

(54) GAME UNIT WITH DUAL JOYSTICK CONTROLLERS

(75) Inventors: Jeffrey Osnato, Cranford, NJ (US); Nicholas Howard, Long Beach, CA (US); Gary Collins, Redondo Beach, CA (US)

(73) Assignee: Mattel, Inc., El Segundo, CA (US)

( * ) Notice: Subject to any disclaimer, the term of this patent is extended or adjusted under 35 U.S.C. 154(b) by 1072 days.

(21) Appl. No.: 11/592,733

(22) Filed: Nov. 2, 2006

(65) Prior Publication Data

US 2007/0155503 A1    Jul. 5, 2007

Related U.S. Application Data

(60) Provisional application No. 60/733,509, filed on Nov. 4, 2005.

(51) Int. Cl.
*A63F 9/24* (2006.01)
*A63F 13/00* (2006.01)
*A63F 13/02* (2006.01)
*A63F 13/12* (2006.01)
*G06F 17/00* (2006.01)

(52) U.S. Cl.
USPC ............. 463/8; 463/2; 463/5; 463/7; 463/30; 463/31; 463/36; 463/37; 463/38; 463/40; 463/46; 463/47

(58) Field of Classification Search
USPC ........ 463/36–38, 2, 5, 7–8, 30–31, 40, 46–47
See application file for complete search history.

(56) References Cited

U.S. PATENT DOCUMENTS

| | | | |
|---|---|---|---|
| 2,088,510 A | 7/1937 | Frasca | |
| 3,235,259 A | 2/1966 | Glass et al. | |
| 3,856,304 A | 12/1974 | Matsumoto et al. | |
| 4,090,712 A | 5/1978 | Shields, Jr. | |
| 4,349,708 A | 9/1982 | Asher | |
| 4,366,960 A | 1/1983 | Bromley et al. | |
| 4,398,717 A | 8/1983 | Rosenfeld et al. | |
| 4,414,438 A | 11/1983 | Maier et al. | |

(Continued)

FOREIGN PATENT DOCUMENTS

EP    830879    3/1998

OTHER PUBLICATIONS

"Afterburner Force Feedback User Manual," 2004, Thrustmaster.*

(Continued)

*Primary Examiner* — Werner Garner
(74) *Attorney, Agent, or Firm* — Kolisch Hartwell, P.C.

(57) ABSTRACT

An electronic game apparatus for providing a game activity. The electronic game apparatus may include a base unit with a game processor adapted to receive a plurality of input signals including an actuator signal and a plurality of directional signals. The game processor may be adapted to determine the game activity based upon the input signals and to transmit output signals representative of the game activity to a monitor device. The apparatus may also include a handle element extending transversely from the base unit in a substantially fixed position relative to the base unit, and may include an actuator that is configured to be manipulated in order to transmit the actuator signal. Optionally, the apparatus may include a direction element, which may be movable in two dimensions relative to the base unit and adapted to transmit the directional signals, extending transversely from the base unit.

19 Claims, 3 Drawing Sheets

(56) References Cited

U.S. PATENT DOCUMENTS

| | | | |
|---|---|---|---|
| 4,469,330 A * | 9/1984 | Asher | 463/38 |
| 4,492,830 A | 1/1985 | Kim | |
| 4,509,383 A | 4/1985 | Yeh | |
| 4,588,187 A | 5/1986 | Dell | |
| 4,695,953 A | 9/1987 | Blair et al. | |
| 4,758,691 A | 7/1988 | De Bruyne | |
| 4,769,517 A | 9/1988 | Swinney | |
| 4,846,693 A | 7/1989 | Baer | |
| 4,850,591 A | 7/1989 | Takezawa et al. | |
| 4,924,216 A * | 5/1990 | Leung | 463/38 |
| 4,976,429 A | 12/1990 | Nagel | |
| 4,995,610 A | 2/1991 | Paoletti | |
| RE33,662 E | 8/1991 | Blair et al. | |
| 5,174,759 A | 12/1992 | Preston et al. | |
| 5,178,545 A | 1/1993 | Thompson | |
| 5,239,464 A | 8/1993 | Blair et al. | |
| 5,288,078 A | 2/1994 | Capper et al. | |
| 5,311,207 A | 5/1994 | Kusumoto et al. | |
| 5,421,590 A * | 6/1995 | Robbins | 463/37 |
| 5,453,758 A | 9/1995 | Sato | |
| 5,511,983 A | 4/1996 | Kashii et al. | |
| 5,558,329 A * | 9/1996 | Liu | 273/148 B |
| D375,326 S | 11/1996 | Yokoi et al. | |
| 5,594,215 A | 1/1997 | Jeng | |
| 5,628,686 A * | 5/1997 | Svancarek et al. | 463/36 |
| 5,668,574 A | 9/1997 | Jarlance-Huang | |
| 5,670,992 A | 9/1997 | Yasuhara et al. | |
| 5,714,981 A * | 2/1998 | Scott-Jackson et al. | 345/161 |
| 5,732,953 A | 3/1998 | Tamura | |
| 5,749,577 A * | 5/1998 | Couch et al. | 273/148 B |
| 5,766,077 A | 6/1998 | Hongo | |
| 5,820,462 A | 10/1998 | Yokoi et al. | |
| 5,919,092 A | 7/1999 | Yokoi et al. | |
| 5,963,199 A | 10/1999 | Kato et al. | |
| 5,967,898 A | 10/1999 | Takasaka et al. | |
| 5,976,018 A * | 11/1999 | Druckman | 463/47 |
| 5,989,094 A | 11/1999 | Tamura | |
| 6,033,309 A * | 3/2000 | Couch et al. | 463/38 |
| 6,068,554 A | 5/2000 | Tyler | |
| 6,093,105 A | 7/2000 | Morihira | |
| 6,162,120 A | 12/2000 | Takahashi et al. | |
| 6,191,777 B1 | 2/2001 | Yasuhara et al. | |
| 6,201,947 B1 | 3/2001 | Hur et al. | |
| 6,280,286 B1 | 8/2001 | Andrews | |
| 6,319,121 B1 | 11/2001 | Yamada et al. | |
| 6,607,437 B2 | 8/2003 | Casey et al. | |
| 6,623,358 B2 | 9/2003 | Harima | |
| 6,645,070 B2 | 11/2003 | Lupo | |
| 6,650,870 B2 * | 11/2003 | White et al. | 455/41.1 |
| 6,714,189 B2 | 3/2004 | Collins | |
| 6,805,631 B2 | 10/2004 | Izumi | |
| 6,809,722 B2 | 10/2004 | Mei et al. | |
| 6,878,062 B2 | 4/2005 | Bjorklund et al. | |
| 2001/0018359 A1 | 8/2001 | Izumi | |
| 2002/0155868 A1 * | 10/2002 | Koshima et al. | 463/1 |
| 2003/0022717 A1 | 1/2003 | Bjorklund et al. | |
| 2003/0036417 A1 | 2/2003 | Ueshima | |
| 2004/0155865 A1 | 8/2004 | Swiader | |
| 2004/0224602 A1 | 11/2004 | Kislevitz et al. | |
| 2004/0259638 A1 | 12/2004 | Kramer et al. | |
| 2005/0014542 A1 | 1/2005 | Ueshima | |
| 2005/0159206 A1 | 7/2005 | Bjorklund et al. | |
| 2005/0245304 A1 | 11/2005 | Takeda et al. | |

OTHER PUBLICATIONS

"Welcome to JAKKS TV Games >> Atari" (screenshot), Feb. 21, 2004, JAKKS Pacific Inc., available at <http://web.archive.org/web/20040202125204/jakkstvgames.com/atari.html>.*

"Warbird Photo Album—Reggiane Re—2005 cockpit" (screenshot), Mar. 25, 2006, ww2aircraft.net available at <http://www.ww2aircraft.net/forum/album/showphoto.php?photo=7238&cat=566>.*

"Syntax Error's Joystick and Controlpad Archive" (screenshot), Oct. 14, 2004, Syntax Error and Mygrandmotherisgone Productions, available at <http://web.archive.org/web/20041014035221/www.syntaxerror.nu/joysticks.html>.*

"Jakks TV Games >> Instructions" (screenshot), Feb. 3, 2004, JAKKS Pacific Inc., available at <http://web.archive.org/web/20040203085024/jakkstvgames.com/instructions.html>.*

"Joysticks and Related Input Devices", May 14, 2002, available at <http://www.vigyan.com/%7Eblbates/hardware/joysticks.html>.*

"Fixed." Dictionary.com, printed on Aug. 29, 2008, available at <http://dictionary.reference.com/browse/fixed>.*

"Joystick." Wikipedia, The Free Encyclopedia. Aug. 11, 2009, 19:28 UTC. Aug. 11, 2009 available at <http://en.wikipedia.org/w/index.php?title=Joystick&oldid=307418248>.*

"Virtual-On Marz", 2003, SEGA of America.*

"SegaSaturn Twin-Stick", 2006, Sega Enterprises.*

"Teleroboxer" Instruction Booklet, 1995 Nintendo.*

International Search Report from International Application No. PCT/US06/43109, mailed Sep. 25, 2007.

* cited by examiner

GAME UNIT WITH DUAL JOYSTICK CONTROLLERS

RELATED APPLICATIONS

The present application claims the benefit of U.S. Provisional Patent Application Ser. No. 60/733,509, filed on Nov. 4, 2005, the complete disclosure of which is hereby incorporated by reference herein in its entirety and for all purposes.

TECHNICAL FIELD

The present disclosure relates to electronic game apparatus, and more particularly to electronic game apparatus that are connected to an audio/video monitor such as a television set, in which one or more participants interact with one or more controllers that each include one or more direction elements and one or more handle elements.

BACKGROUND OF THE DISCLOSURE

An electronic game apparatus may include one or more controller units that may be manipulated by one or more participants in order to simulate a game activity such as a boxing game. Examples of electronic game assemblies using electronic inputs, controllers for video games or other computing devices, and/or mechanical boxing games are found in U.S. Pat. Nos. 2,088,510; 3,235,259; 3,856,304; 4,090,712; 4,349,708; 4,366,960; 4,398,717; 4,414,438; 4,492,830; 4,509,383; 4,588,187; 4,695,953; 4,758,691; 4,769,517; 4,846,693; 4,850,591; 4,976,429; 4,995,610; 5,174,759; 5,178,545; 5,239,464; 5,288,078; 5,311,207; 5,421,590; 5,453,758; 5,511,983; 5,594,215; 5,668,574; 5,670,992; 5,732,953; 5,749,577; 5,766,077; 5,820,462; 5,919,092; 5,963,199; 5,967,898; 5,976,018; 5,989,094; 6,033,309; 6,068,554; 6,093,105; 6,162,120; 6,191,777; 6,201,947; 6,280,286; 6,319,121; 6,607,437; 6,623,358; 6,645,070; 6,714,189; 6,805,631; 6,809,722; 6,878,062; and RE33662; in U.S. Design Pat. No. D375326; in U.S. Patent Application Publication Nos. 2001/0018359; 2003/0022717; 2003/0036417; 2004/0155865; 2004/0224602; 2004/0259638; 2005/0014542; 2005/0159206; and 2005/0245304; and in European Patent No. EP830879. The entire disclosures of each of the patents, patent applications, and patent application publications recited in this and in other paragraphs are all incorporated by reference herein in their entirety and for all purposes.

SUMMARY OF THE DISCLOSURE

An electronic game apparatus for providing a game activity on a monitor device may include a base unit with a game processor adapted to receive a plurality of input signals. The input signals may include at least an actuator signal and a plurality of directional signals. The game processor may be adapted to determine the game activity based upon the plurality of input signals and to transmit output signals representative of the game activity to the monitor device. The apparatus may also include a handle element extending transversely from the base unit. The handle element may be in a substantially fixed position relative to the base unit and may include an actuator that is configured to be manipulated by a player grasping the handle element. The actuator may be adapted to transmit the actuator signal to the game processor. Optionally, the apparatus may include a direction element extending transversely from the base unit. The direction element may be movable in two dimensions relative to the base unit and adapted to transmit the plurality of directional signals to the game processor.

DETAILED DESCRIPTION OF THE DISCLOSURE

Electronic game apparatus that simulate combat or boxing matches may be operated by one or more participants or players. These electronic game apparatus may include one or more controller units that are each adapted to be manipulated by one or more participants to provide input signals that are transmitted to a game processor to determine a game activity. The game processor may be adapted to transmit output signals representative of the game activity to a monitor device, such as a television set.

Figure 1:
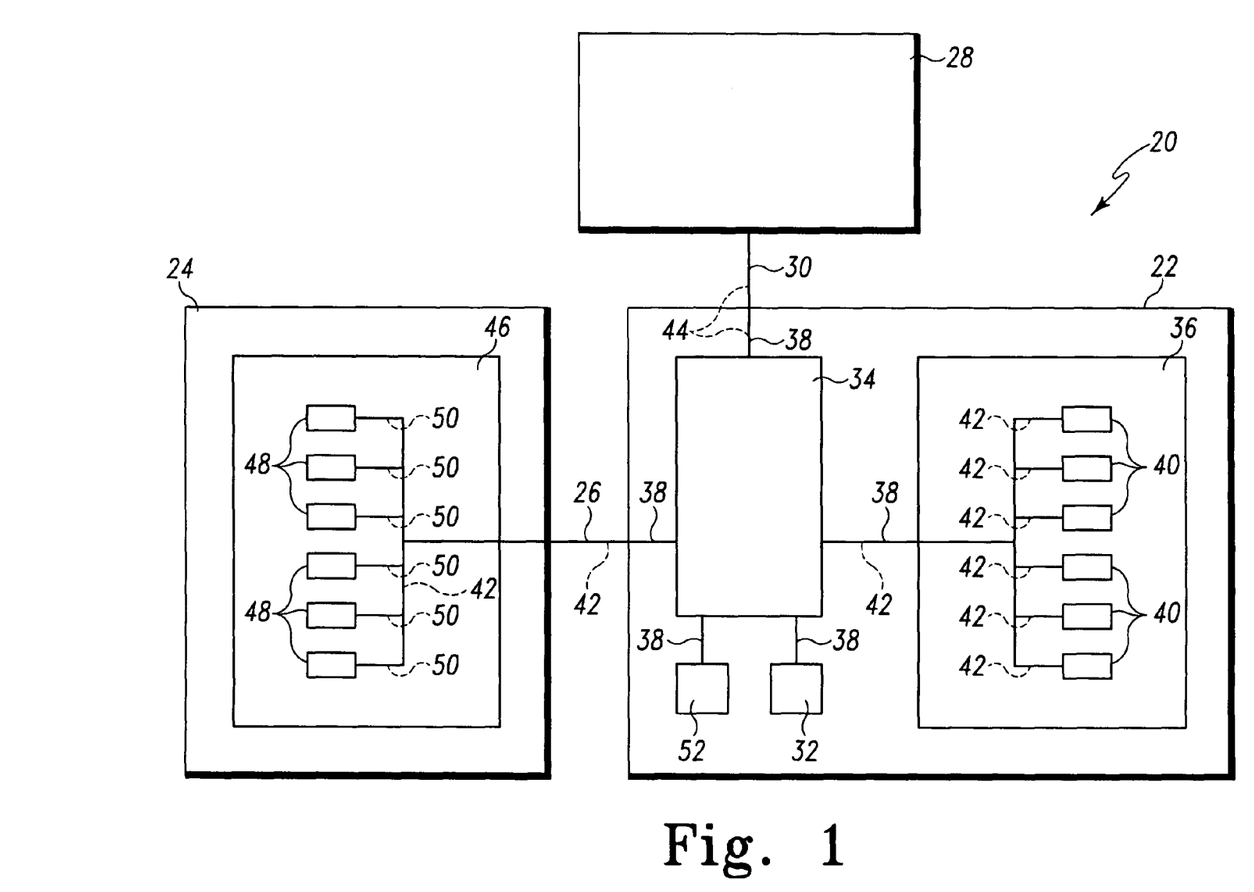
FIG. 1 is a schematic of an electronic game apparatus according to the present disclosure.

Turning now to the drawings, a schematic representation of an exemplary electronic game apparatus is shown in FIG. 1, and is indicated generally at 20. Electronic game apparatus 20 may include a base unit 22, an auxiliary unit 24, and an inter-unit linkage 26 that operatively and electrically connects the auxiliary unit to the base unit. Base unit 22 may also be operatively connected to a monitor device 28 by way of a monitor linkage 30.

Base unit 22 may include a power supply 32, a game processor 34, a base controller 36, and a plurality of connectors 38. Power supply 32 may include at least one of one or more batteries, an AC/DC converter, and the like. Game processor 34 may include one or more analog or digital circuits, logic units, or processors for operating programs stored as software in memory, and may include one or more distinct units in communication with each other. Base controller 36 may include a plurality of input devices 40 that are each adapted to produce one or more input signals 42. Input devices 40 may include any combination of joysticks, trackballs, level switches, contact switches, and other suitable devices. Connectors 38 may include a plurality of cables, wires, and/or wireless connections that are adapted to transmit input signals 42 and/or power from other components of electronic game apparatus 20 to game processor 34. Accordingly, connectors may each include any suitable number of conductors. In some examples, multiple auxiliary units 24 may be used. In other examples, base unit 22 may not include a base controller 36, and such examples may include a plurality of auxiliary units 24.

Game processor 34 may be adapted to receive input signals 42 and to determine a game activity based upon the input signals. The game processor may also be adapted to determine output signals 44 representative of the game activity and to transmit the output signals to monitor device 28 along monitor linkage 30. Output signals 44 may include audio and video signals that may be rendered by a conventional television set.

Auxiliary unit 24 may include an auxiliary controller 46 that may also include a plurality of auxiliary input devices 48 that are each adapted to produce one or more auxiliary input signals 50. The auxiliary input signals may be transmitted to game processor 34 and may be included in the plurality of input signals 42 that are used by the game processor to determine the game activity. Auxiliary input devices 48 may also include any combination of joysticks, trackballs, level switches, contact switches, and other suitable devices.

Optionally, base unit 22 may include memory components 52, e.g. in game processor 34 or in electrical communication with the game processor, that store game parameters. Memory components 52 may be either non-removable or removable in order to transfer parameters to other electronic game apparatus 20. Additionally or alternatively, the base unit may include removable devices, which contain programming code to allow electronic game apparatus 20 to play alternately themed games.

Figure 2:
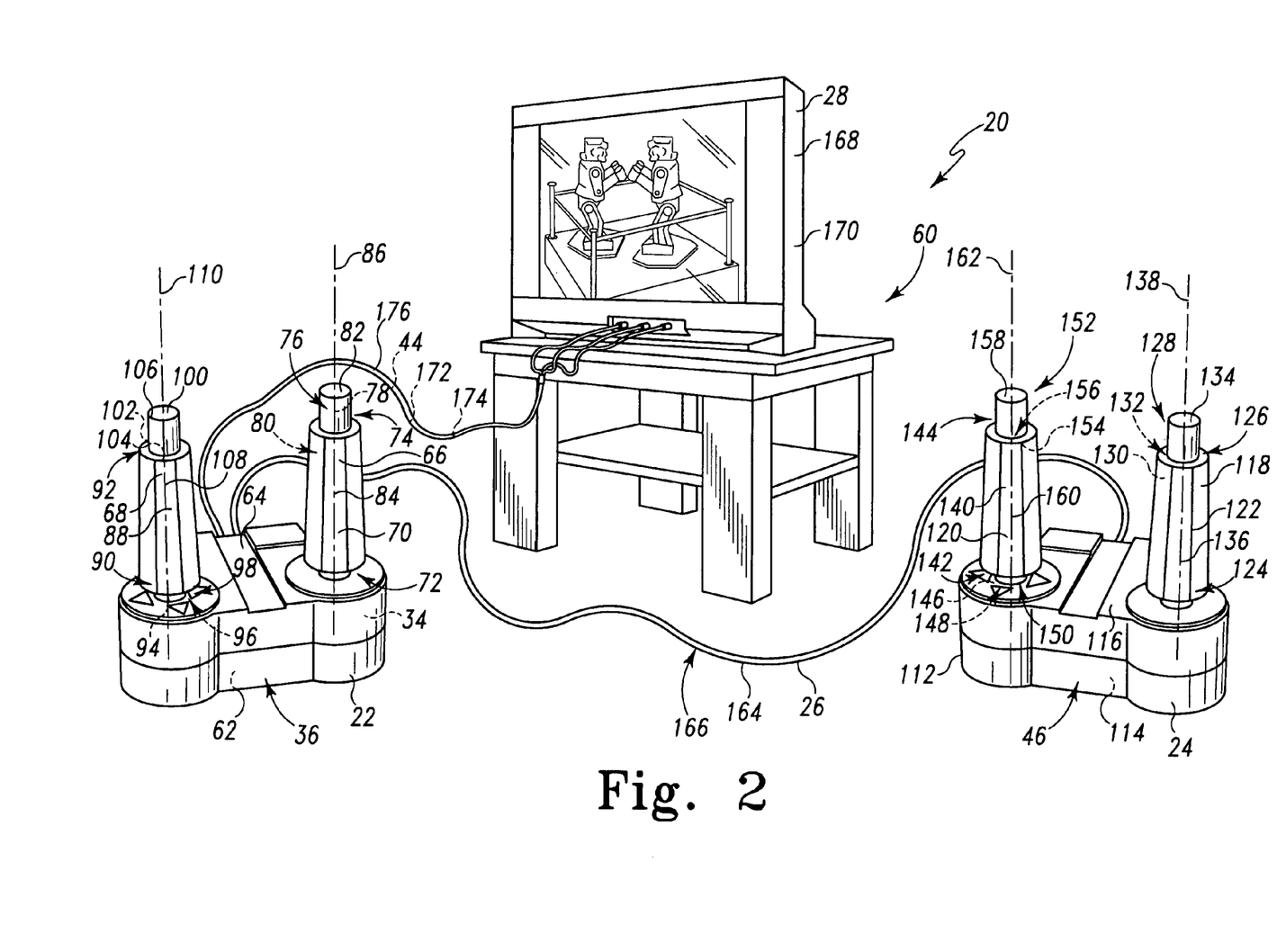
FIG. 2 is a perspective view of an exemplary electronic game apparatus according to the present disclosure.

As shown in FIG. 2, one non-exclusive embodiment of electronic game apparatus 20 may provide a simulation of a boxing match between two participants, or between one participant and a computer player. The embodiment is indicated generally at 60. Other embodiments may simulate activities such as sword fighting, wrestling, or any type of video game. Electronic boxing game apparatus 60 may include play modes that allow any number of players. Specific combinations of input signals created by manipulation of input devices may correspond to specific game activities such as character movements, punches, and blocks. The illustrated embodiment allows for either one or two players.

Electronic boxing game apparatus 60 may include base unit 22 having base controller 36, auxiliary unit 24 having auxiliary controller 46, and inter-unit linkage 26. Base unit 22 may have a substantially flat lower surface 62 that may be adapted to rest on a tabletop or other suitable surface, or in the lap of the participant or player. The base unit may also include an upper surface 64 that is opposite from the lower surface.

Also shown in FIG. 2, base unit 22 may include a handle element 66 and a direction element 68. Handle element 66 may include a handle grip portion 70 that extends transversely from the base unit, for example from upper surface 64. In some embodiments, the handle element, or the handle grip portion, may extend substantially perpendicularly from the base unit and/or from the upper surface. The handle grip portion may have a first end 72 opposite a second end 74. Handle element 66, for example at handle grip portion 70, may join the base unit at the first end. Handle element 66 may be substantially fixed in position relative to base unit 22. Accordingly, the player may hold base unit 22 in a steady position using handle grip portion 70 while moving direction element 68 as described below, instead of resting the base unit on a tabletop or other surface. Optionally, the handle element may be movable relative to the base unit.

Handle element 66 may include one or more input devices that may be adapted to produce one or more input signals. In the illustrated example, the handle element includes an actuator 76 disposed at second end 74 that is configured to be manipulated by the participant grasping the grip portion in order to produce an actuator signal 78. Actuator 76 may include a switch 80 that is adapted to provide a closed circuit thereby transmitting actuator signal 78. Switch 80 may be operatively coupled to a button 82 that may be movable between a depressed position in which the button is adapted to operate the switch to close the circuit and a rest position in which the button is biased away from the depressed position, thereby opening the circuit.

Other examples may include additional or alternative input devices that, like actuator 76, may be disposed at positions along handle element 66 or handle grip portion 70 other than at second end 74. Examples of alternative input devices may include analog pressure switches, switches with multiple positions, switches that are operatively coupled to buttons that are biased toward a position where the button is adapted to operate the switch to close the circuit.

Handle element 66 and/or handle grip portion 70 may extend along a handle element axis 84. Actuator 76 and/or button 82, when manipulated, may travel along an actuator axis 86 that may be substantially parallel to handle element axis 84. In some examples, the handle element axis and the actuator axis may coincide.

Direction element 68 may include a direction grip portion 88 that extends transversely from the base unit, for example from upper surface 64. The direction grip portion may include a first end 90 opposite a second end 92. Direction element 68, for example at direction grip portion 88, may join the base unit at the first end.

Direction element 68 may include one or more input devices that may be adapted to produce one or more input signals. For example, the direction element may be capable of transmitting a plurality of direction signals 94 to game processor 34. Direction element 68, for example at direction grip portion 88, may be pivotably coupled to base unit 22 and may be movable in two or three dimensions relative to the base unit at first end 90 in order to produce the direction signals. The direction element may include a plurality of switches 96, or other sensors, disposed at first end 90 that are adapted to be depressed by an end member 98 of direction grip portion 88 to close a circuit, or otherwise operated, thereby transmitting direction signals 94. There may be four switches 96 that correspond generally to the directions of up, down, left, and right, and there may be a direction signal 94 corresponding to each of these directions. In some embodiments, the direction element may be biased toward a rest position in which the direction grip portion extends substantially perpendicularly from the base unit and/or from the upper surface. The rest position may correspond to a position in which none of the direction signals are transmitted.

The direction element may also include a direction element actuator 100 disposed at second end 92 that may be configured to be manipulated by the participant grasping the direction grip portion in order to produce a direction element actuator signal 102. Direction element actuator 100 may include a switch 104 that may be adapted to provide a closed circuit thereby transmitting direction element actuator signal 102. Switch 104 may be operatively coupled to a button 106 that may be movable between a depressed position in which the button is adapted to operate the switch to close the circuit and a rest position in which the button is biased away from the depressed position, thereby opening the circuit.

Other switch or sensor configurations may be used. For example, additional or alternative input devices, like direction element actuator 100, may be disposed at positions along direction element 68 or direction grip portion 88 other than at second end 92. Examples of alternative input devices may include analog pressure switches, switches with multiple positions, switches that are operatively coupled to buttons that are biased toward a position where the button is adapted to operate the switch to close the circuit, and/or alternative input devices to produce the direction signals, such as trackballs, touchpads, joypads, and the like.

Direction element 68 or, more particularly, direction grip portion 88 may extend along a direction element axis 108. Direction element actuator 100 and/or button 106, when manipulated, may travel along a direction actuator axis 110 that may be substantially parallel to direction element axis 108. In some examples, the direction element axis and the actuator axis may coincide.

Auxiliary unit 24 may include an auxiliary base unit 112 that may have a substantially flat lower surface 114 that may be adapted to rest on a tabletop or other suitable surface, or in the lap of a second participant or player. The base unit may also include an upper surface 116 that is opposite from the lower surface.

Auxiliary base unit 112 may include an auxiliary handle element 118 and an auxiliary direction element 120. Auxiliary handle element 118 may include an auxiliary handle grip portion 122 that extends transversely from the auxiliary base unit or, for example from upper surface 116. In some embodiments, the auxiliary handle element, or the auxiliary handle grip portion, may extend substantially perpendicularly from the auxiliary base unit and/or from the upper surface. The auxiliary handle grip portion may include a first end 124 opposite a second end 126. Auxiliary handle element 118 or, more particularly, auxiliary handle grip portion 122 may join the base unit at the first end. Auxiliary handle element 118 may be substantially fixed in position relative to auxiliary base unit 112. Accordingly, the player may hold auxiliary base unit 112 in a steady position using auxiliary handle grip portion 112 while moving auxiliary direction element 120 as described below, instead of resting the auxiliary base unit on a tabletop or other surface. Optionally, the auxiliary handle element may be movable relative to the auxiliary base unit.

Auxiliary handle element 118 may include one or more auxiliary input devices that may be adapted to produce one or more auxiliary input signals. In the illustrated example, the auxiliary handle element includes an auxiliary actuator 128 disposed at second end 126 that is configured to be manipulated by the second participant grasping the auxiliary handle grip portion and producing auxiliary actuator signal 130.

Auxiliary actuator 128 may include a switch 132 that is adapted to provide a closed circuit thereby transmitting auxiliary actuator signal 130. Switch 132 may be operatively coupled to a button 134 that may be movable between a depressed position in which the button is adapted to operate the switch to close the circuit and a rest position in which the button is biased away from the depressed position, thereby opening the circuit.

Other switch or sensor configurations may be used. For example, additional or alternative input devices, like auxiliary actuator 128, may be disposed at positions along auxiliary handle element 118 or auxiliary handle grip portion 122 other than at second end 126. Examples of alternative input devices may include analog pressure switches, switches with multiple positions, switches that are operatively coupled to buttons that are biased toward a position where the button is adapted to operate the switch to close the circuit.

Auxiliary handle element 118, for example at auxiliary handle grip portion 122, may extend along an auxiliary handle element axis 136. Auxiliary actuator 128, when it is manipulated, may travel along an auxiliary actuator axis 138 that may be substantially parallel to auxiliary handle element axis 136. In some examples, the auxiliary handle element axis and the auxiliary actuator axis may coincide.

Auxiliary direction element 120 may include an auxiliary direction grip portion 140 that extends transversely from the base unit, for example from upper surface 116. The auxiliary direction element, or the auxiliary direction grip portion, may include a first end 142 opposite a second end 144. Auxiliary direction element 120 or, more particularly, auxiliary direction grip portion 140 may join the base unit at the first end.

Auxiliary direction element 120 may include one or more auxiliary input devices that may be adapted to produce one or more auxiliary input signals. For example, the auxiliary direction element may be capable of transmitting a plurality of auxiliary direction signals 146 to game processor 34. Accordingly, auxiliary direction element 120, for example at auxiliary direction grip portion 140, may be pivotably coupled to auxiliary base unit 112 and may be movable in two or three dimensions relative to the auxiliary base unit in order to produce the auxiliary direction signals.

The auxiliary direction element may include a plurality of switches 148 or other sensors disposed at first end 142 that are adapted to be depressed by an end member 150 of auxiliary direction grip portion 140 to close a circuit or otherwise operated, thereby transmitting auxiliary direction signals 146. There may be four switches 148 that correspond generally to the directions of up, down, left, and right, and there may be one auxiliary direction signal 146 corresponding to each of these directions. In some embodiments, the auxiliary direction element may be biased toward a rest position in which the auxiliary direction grip portion extends substantially perpendicularly from the auxiliary base unit and/or from the upper surface. The rest position may correspond to a position in which none of the auxiliary direction signals are transmitted.

The auxiliary direction element may also include an auxiliary direction element actuator 152 disposed at second end 144 that is configured to be manipulated by the second participant grasping the auxiliary direction grip portion in order to produce an auxiliary direction element actuator signal 154. Auxiliary direction element actuator 152 may include a switch 156 that may be adapted to provide a closed circuit thereby transmitting auxiliary direction element actuator signal 154. Switch 156 may be operatively coupled to a button 158 that may be movable between a depressed position in which the button is adapted to operate the switch to close the circuit and a rest position in which the button is biased away from the depressed position, thereby opening the circuit.

Other switch or sensor configurations may be used. For example, additional or alternative input devices, like auxiliary direction element actuator 152, may be disposed at positions along auxiliary direction element 120 or auxiliary direction grip portion 140 other than at second end 144. Examples of alternative input devices may include analog pressure switches, switches with multiple positions, switches that are operatively coupled to buttons that are biased toward a position where the button is adapted to operate the switch to close the circuit, and/or alternative input devices to produce the direction signals, such as trackballs, touchpads, joypads, and the like.

Auxiliary direction element 120 or, more particularly, auxiliary direction grip portion may extend along an auxiliary direction element axis 160. Auxiliary direction element actuator 152, when it is manipulated, may travel along an auxiliary direction actuator axis 162 that may be substantially parallel to auxiliary direction element axis 160. In some examples, the auxiliary direction element axis and the auxiliary actuator axis may coincide.

In electronic boxing game apparatus 60 shown in FIG. 2, auxiliary unit 24 is operatively and/or electrically coupled to base unit 22 via inter-unit linkage 26. The inter-unit linkage may include a wired connection 164 that may have several conductors 166 that are each adapted to transmit one or more auxiliary input signals. In other examples, inter-unit linkage may include a wireless connection that may use suitable electromagnetic energy such as electric fields, magnetic fields, and electromagnetic radiation operating at radio-frequency (RF), infrared, or optical regimes. Optionally, inter-unit linkage 26 may include a combination of wired and wireless connections and/or may use fewer conductors than auxiliary input signals by employing appropriate serial data transfer techniques.

As also shown in FIG. 2, direction element 68 and auxiliary direction element 120 are each adapted to be manipulated by the left hand of the a player to produce direction signals 94 and auxiliary direction signals 146. Similarly, handle element 66 and auxiliary handle element 118 are each adapted to be manipulated in the right hand of the player. In other examples, the relative positioning of the direction elements and the handle elements may be reversed, such that the handle elements are adapted to be manipulated by the left hand and the direction elements are adapted to be manipulated by the right hand.

As has been mentioned, monitor device 28 may include a conventional audio/video monitor device 168 such as a television set 170, or a suitable alternative. Accordingly, output signals 44 may include an audio signal 172 and a video signal 174 that game processor may transmit to the monitor device via a multi-conductor cable 176, such as conventional RCA or phono cabling, that operatively connects the base unit to the monitor device. Audio signal 172 may be either monophonic or stereophonic. Similarly, video signal 174 may be formatted using conventional composite video encoding or conventional RGB encoding. Multi-conductor cable 176 may therefore include any appropriate number of conductors, according to the format of the output signals. In other embodiments, output signals 44 may be transmitted to television set 170, or a suitable alternative, via a coaxial cable that is operatively connected to the antenna jack of the television set, or via any other connections known in the art.

Electronic game apparatus 20 or, more specifically, electronic boxing game apparatus 60 may provide a plurality of play modes that provide a player a way to learn skills required by one or more competitive modes, in which the player competes against one or more animated characters, or against a second player. Accordingly, the depicted embodiment may include a tutorial or "training" game mode in which the player may practice offensive and/or defensive boxing maneuvers using base controller 36 and/or auxiliary controller 46. Different boxing maneuvers may correspond to different combinations of input signals 42.

For example, movement of direction element 68 and/or auxiliary direction element 120 to the left may transmit direction signals 94 and/or auxiliary direction signals 146 that cause game processor 34 to move a character to the left. Similarly, a rapid movement of direction element 68 and/or auxiliary direction element 120 to the left two or more times may transmit direction signals 94 and/or auxiliary direction signals 146 that cause a character to dodge a punch to its left. As another example, depressing one or more of actuator 76, direction element actuator 100, auxiliary actuator 128 and/or auxiliary direction element actuator 152, may transmit input signals that cause a character to throw a punch with one or both hands. Different durations of time of depressing the actuators may affect the strength or type of punch thrown by the game character.

In the "training" mode, a player has the opportunity to interact with various objects typically used in the training of boxers, such as punching bags, speed bags, and various other items. Other play modes of the illustrated embodiment may include various ways of conducting boxing matches with one or more animated opponents, which may be controlled either by a second player or by a computer unit. For example, electronic boxing game apparatus 60 may include a "title fight" mode where the player conducts a series of boxing matches with a progression of computer controlled opponents, with the requirement that the player defeat each opponent before progressing to the next, more challenging opponent. A player who has defeated the final opponent has conquered the game. Defeat of the opponent, or the player, may occur when the player or opponent has landed a punch of sufficient strength, or a number of punches of sufficient strength. Electronic boxing game apparatus 60 may include animations corresponding to the defeat of the player, or of each of the animated opponent characters, corresponding to the head pop-off action of the mechanical "Rock-'em Sock-'em Robots" game. Each animated opponent character may have a specific characteristic offensive and/or defensive boxing maneuver and/or a specific animation corresponding to its defeat.

Optionally, electronic boxing game apparatus 60 may include a "versus" mode and/or a "classic" mode. In "versus" mode, a player may select an opponent character from a list of available opponent characters. In some embodiments, the list may comprise the opponent characters that the player has defeated in the "title fight" mode. In "classic" mode, the player may compete against a second player, or against the computer. The player may select modes of play by manipulating input devices 40.

Figure 3:
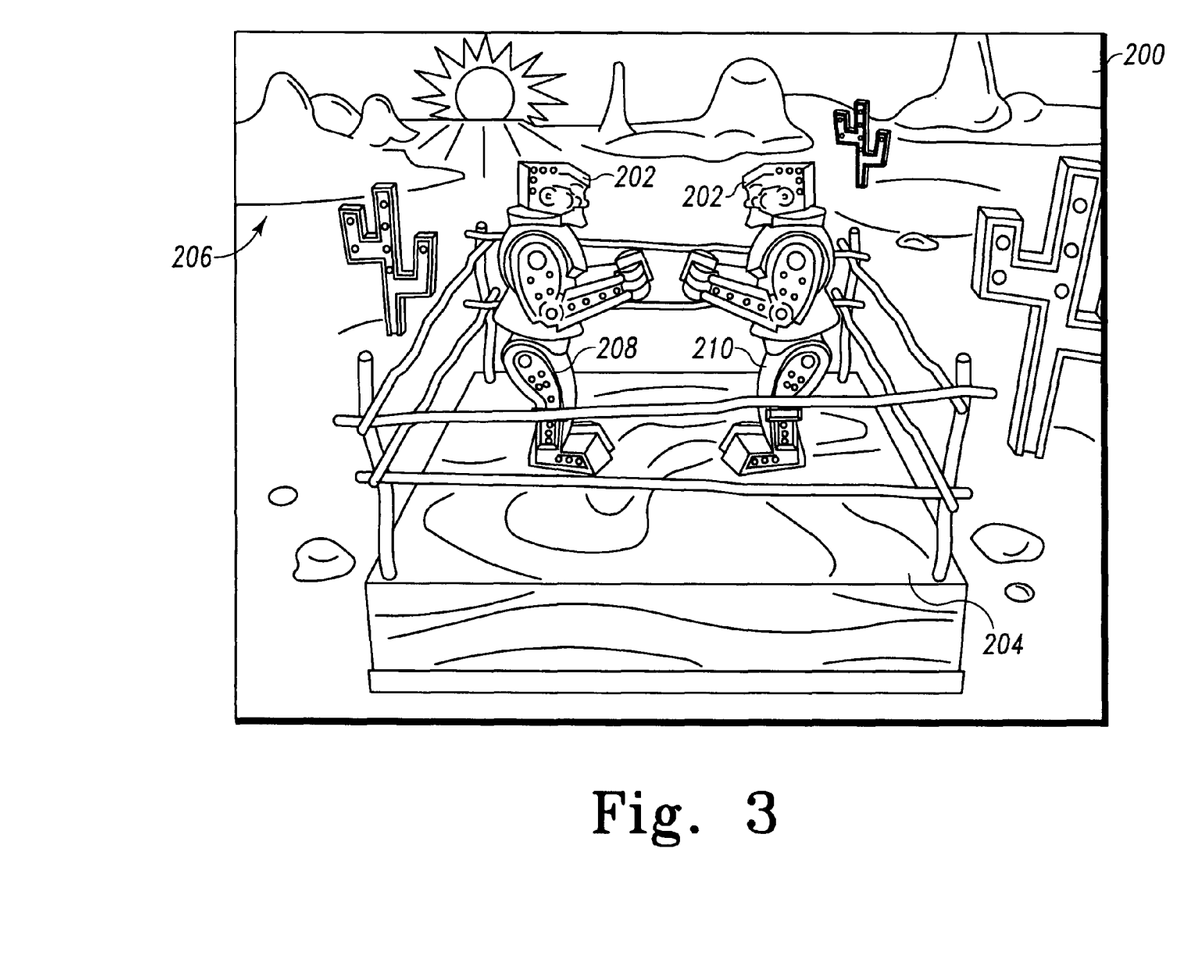
FIG. 3 is a rendering of an exemplary visual depiction a game activity of the electronic game apparatus of FIG. 2.

During play of electronic boxing game apparatus 60, game processor 34 may be adapted to send various audio and video signals representative of the game activity to monitor device 28. FIG. 3 shows a visual depiction 200 including robot boxers 202 competing in a boxing ring 204 that is disposed within a background scenery 206. Robot boxers 202 include a player character 208 and an opponent character 210. The boxing ring and/or the background scenery may have different characteristics corresponding to the opponent character.

In the one-player modes, player character 208 may assume a number of positions and/or may execute a number of offensive or defensive boxing maneuvers. Different maneuvers may require different manipulations, or series of manipulations, of base controller 36. Depending on game mode or on previous play history the player character may be able to perform different maneuvers and/or may have different offensive or defensive capabilities. In competitive one-player modes, game processor 34 may determine actions of opponent character 210. These actions may follow a predetermined pattern, may follow a random pattern, and/or may be in response to one or more actions of player character 208.

Opponent character 210 may be selected from a plurality of opponent characters that may each employ a unique set of "special" offensive and/or defensive boxing maneuvers, in addition to a "standard" set of maneuvers that all opponent characters may employ. The capabilities of player character 208 may overlap with the capabilities of the plurality of opponent characters. In some examples, the player character may "earn" the "special" capabilities of each of the opponent characters that the player character has defeated. In these examples, electronic boxing game apparatus 60 may be adapted to store a history of game activities on memory components 52.

In two-player modes, opponent character 210 may assume a number of positions and/or may execute a number of offensive or defensive boxing maneuvers. Different maneuvers may require different manipulations, or series of manipulations, of auxiliary controller 46. The maneuvers available to the second player, as well as the appearance of opponent character 210, may be selectable from the maneuvers and/or appearances corresponding to one or more of the plurality of opponent characters.

This disclosure may include one or more independent or interdependent inventions directed to various combinations of features, functions, elements and/or properties. While examples of apparatus and methods are particularly shown and described, many variations may be made therein. Various combinations and sub-combinations of features, functions, elements and/or properties may be claimed in one or more related applications. Such variations, whether they are directed to different combinations or directed to the same combinations, whether different, broader, narrower or equal in scope, are regarded as included within the subject matter of the present disclosure.

The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed. Where "a" or "a first" element or the equivalent thereof is recited, such usage includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

INDUSTRIAL APPLICABILITY

The methods and apparatus described in the present disclosure are applicable to toys, games, and other devices, and industries in which amusement devices are used.

We claim:

1. An electronic game apparatus for providing a game activity on a monitor device, comprising:
    a base unit including a game processor adapted to receive a plurality of input signals including at least an actuator signal and a plurality of directional signals, the game processor being further adapted to determine the game activity based upon the plurality of input signals and to transmit output signals representative of the game activity to the monitor device;
    a handle element extending transversely from the base unit, the handle element including a handle grip portion extending along a handle element axis between a first end and a second opposite end, the handle grip portion joining the base unit at its first end and having disposed at its second end an actuator that is configured to be manipulated by a player grasping the handle element so that when manipulated, the actuator travels along an actuator axis that is parallel to and coincides with the handle element axis, the actuator being adapted to transmit the actuator signal to the game processor; and
    a direction element separate from the handle element and also extending transversely from the base unit and movable in two dimensions relative to the base unit, the direction element including a direction grip portion extending along a direction element handle axis between a first end and a second opposite end, wherein the direction grip portion is pivotably coupled to the base unit at its first end and includes disposed at its second end a direction element actuator adapted to be manipulated by the player so that when manipulated, the direction element actuator is adapted to travel along a direction element actuator axis that is parallel to and coincides with the direction element handle axis, wherein the direction element is adapted to transmit the plurality of directional signals to the game processor, and the direction element actuator is adapted to transmit a direction element actuator signal, which is distinct from the actuator signal of the handle element actuator, to the game processor;
    wherein the player grasping the handle element may hold the base unit in a steady position while moving the direction element;
    wherein the output signals transmitted by the game processor direct the monitor device to display simulated robot characters that move and fight each other based on the output signals; and
    wherein the actuator signal and the directional element actuator signal cause the one of the robot characters to throw a punch with one or both hands.

2. The electronic game apparatus of claim 1, wherein the base unit includes a lower surface adapted to rest on a tabletop, the base unit further including an upper surface opposite the lower surface, and wherein the handle element and the direction element extend transversely from the upper surface.

3. The electronic game apparatus of claim 2, wherein the handle element extends perpendicularly from the upper surface of the base unit.

4. The electronic game apparatus of claim 1, wherein the direction element extends perpendicular from the base unit when the direction element is in a rest position.

5. The electronic game apparatus of claim 1, wherein the plurality of input signals further include a plurality of auxiliary input signals including at least an auxiliary actuator signal and a plurality of auxiliary directional signals, the electronic game apparatus further comprising an auxiliary unit including:
    an auxiliary base unit operatively coupled to the base unit adapted to transmit the plurality of auxiliary input signals to the game processor, the plurality of auxiliary input signals including at least an auxiliary actuator signal and a plurality of auxiliary directional signals;
    an auxiliary handle element extending transversely from the auxiliary base unit, the handle element being fixed relative to the auxiliary base unit and including an auxiliary actuator that is configured to be manipulated by a second player grasping the auxiliary handle element, the auxiliary actuator being adapted to transmit the auxiliary actuator signal to the game processor; and
    an auxiliary direction element, separate from the handle element and also extending transversely from the auxiliary base unit and movable in two dimensions relative to the auxiliary base unit, the auxiliary direction element adapted to transmit the plurality of auxiliary directional signals to the game processor.

6. The electronic game apparatus of claim 5, wherein the auxiliary handle element extends perpendicularly from the auxiliary base unit.

7. The electronic game apparatus of claim 5, wherein the auxiliary handle includes an auxiliary handle grip portion having a first end opposite a second end, wherein the auxiliary handle grip portion joins the auxiliary base unit at the first end, and wherein the auxiliary actuator is disposed at the second end.

8. The electronic game apparatus of claim 7, wherein the auxiliary handle grip portion extends along an auxiliary handle element axis, and wherein, when the auxiliary actuator is manipulated, the auxiliary actuator travels along an auxiliary actuator axis.

9. The electronic game apparatus of claim 8, wherein the auxiliary handle element axis and the auxiliary actuator axis coincide.

10. The electronic game apparatus of claim 5, wherein the auxiliary direction element includes an auxiliary direction element actuator configured to be manipulated by a hand of the second player, the auxiliary direction element actuator being adapted to transmit an auxiliary direction element actuator signal to the game processor.

11. The electronic game apparatus of claim 10, wherein the auxiliary direction element includes an auxiliary direction element grip portion having the auxiliary direction element actuator, wherein the direction grip portion has a first end opposite a second end, wherein the auxiliary direction grip portion is pivotably coupled to the auxiliary base unit at the first end, and the auxiliary direction element actuator is disposed at the second end.

12. The electronic game apparatus of claim 11, wherein the auxiliary direction grip portion extends along an auxiliary direction element handle axis, and wherein, when the auxiliary direction element actuator is manipulated, the auxiliary direction element actuator travels along an auxiliary direction element actuator axis.

13. The electronic game apparatus of claim 12, wherein the auxiliary direction element handle axis and the auxiliary direction element actuator axis coincide.

14. The electronic game apparatus of claim 5, wherein the auxiliary direction element includes an auxiliary direction element handle pivotably coupled to the auxiliary base unit, the auxiliary direction element handle extending perpendicular from the auxiliary base unit when the auxiliary direction element is in a rest position.

15. The electronic game apparatus of claim 5, wherein the auxiliary base unit is adapted to transmit the plurality of auxiliary input signals to the game processor via a wired connection.

16. The electronic game apparatus of claim 1, wherein the monitor device includes an audio/video monitor device, and wherein the output signals include at least one audio signal and at least one video signal.

17. The electronic game apparatus of claim 16, further comprising a multi-conductor cable operatively coupled to the game processor and adapted to be removably coupled to the audio/video monitor device.

18. An electronic game system for providing a game activity on a monitor device, the electronic game system adapted to be transitioned selectively between a one-player configuration and a two-player configuration, comprising:
a base unit including:
a game processor adapted to receive a plurality of input signals including at least an actuator signal, a plurality of directional signals, and, in the two-player configuration, a plurality of auxiliary input signals, the game processor being further adapted to determine the game activity based upon the plurality of input signals and to transmit output signals representative of the game activity to the monitor device;
a handle element extending transversely from the base unit, the handle element including a handle grip portion extending along a handle element axis between a first end and a second opposite end, the handle grip portion joining the base unit at its first end and having disposed at its second end an actuator that is configured to be manipulated by a first player grasping the handle element so that when manipulated, the actuator travels along an actuator axis that is parallel to and coincides with the handle element axis, the actuator being adapted to transmit the actuator signal to the game processor; and
a direction element separate from the handle element and also extending transversely from the base unit and movable in two dimensions relative to the base unit, the direction element including a direction grip portion extending along a direction element handle axis between a first end and a second opposite end, wherein the direction grip portion is pivotably coupled to the base unit at its first end and includes disposed at its second end a direction element actuator adapted to be manipulated by the first player so that when manipulated, the direction element actuator is adapted to travel along a direction element actuator axis that is parallel to and coincides with the direction element handle axis, wherein the direction element is adapted to transmit the plurality of directional signals to the game processor, and the direction element actuator is adapted to transmit a direction element actuator signal, which is distinct from the actuator signal of the handle element actuator, to the game processor;
wherein the first player grasping the handle element may hold the base unit in a steady position while moving the direction element; and
an auxiliary unit including:
an auxiliary base unit operatively coupled to the base unit in the two-player configuration and having an electronic circuit adapted to transmit a plurality of auxiliary input signals to the game processor, the plurality of auxiliary input signals including at least an auxiliary actuator signal and a plurality of auxiliary directional signals, the auxiliary unit including:
an auxiliary handle element extending transversely from the auxiliary base unit, the auxiliary handle element including an auxiliary actuator that is configured, in the two-player configuration, to be manipulated by a second player grasping the auxiliary handle element, the auxiliary actuator being adapted to transmit the auxiliary actuator signal to the game processor; and
an auxiliary direction element separate from the handle element and also extending transversely from the auxiliary base unit and movable in two dimensions relative to the auxiliary base unit, the auxiliary direction element adapted to transmit the plurality of auxiliary directional signals to the game processor;
wherein the second player grasping the auxiliary handle element may hold the auxiliary base unit in a steady position while moving the auxiliary direction element; and
wherein the output signals transmitted by the game processor direct the monitor device to display simulated robot characters that move and fight each other based on the output signals;
wherein the actuator signal and the directional element actuator signal cause the one of the robot characters to throw a punch with one or both hands.

19. The electronic game system of claim 18, wherein the auxiliary unit is fixedly coupled to the base unit.

* * * * *